United States Patent [19]

Miki et al.

[11] Patent Number: 5,328,767

[45] Date of Patent: Jul. 12, 1994

[54] RESIN COMPOSITION AND MULTI-LAYER STRUCTURAL MATERIAL THEREFROM

[75] Inventors: Yasuaki Miki; Shoji Takano, both of Yokohama; Junichi Goto, Kawasaki; Takayuki Ota, Sagamihara, all of Japan

[73] Assignee: Mitsubishi Kasei Corporation, Tokyo, Japan

[21] Appl. No.: 868,654

[22] Filed: Apr. 15, 1992

[30] Foreign Application Priority Data

Apr. 15, 1991 [JP] Japan .................................. 3-82485
Mar. 9, 1992 [JP] Japan .................................. 4-50846

[51] Int. Cl.$^5$ ...................... B32B 27/08; B32B 27/32; B32B 27/34; B32B 27/36
[52] U.S. Cl. ............................ 428/423.7; 428/424.2; 428/424.4; 428/424.8; 525/66; 525/183
[58] Field of Search ............ 525/66; 428/423.7, 424.8, 428/424.4, 424.2

[56] References Cited

FOREIGN PATENT DOCUMENTS

| AU-B- | | | |
|---|---|---|---|
| 52275/90 | 10/1990 | Australia . | |
| 0117622 | 9/1984 | European Pat. Off. | 428/423.7 |
| 0459862 | 12/1991 | European Pat. Off. . | |
| 3296941 | 12/1988 | Japan | 428/423.7 |
| 2226323 | 6/1990 | United Kingdom | 428/423.7 |

OTHER PUBLICATIONS

World Patents Index Latest, week 8507, 85-042232, and JP-A-60-002-362, Jan. 8, 1985, "Plastic Tube Refrigerate Hose Comprise More Layer Polyesteramide Polyamide Resin One Contain Modified Polyolefin".

*Primary Examiner*—Ana L. Carrillo
*Attorney, Agent, or Firm*—Oblon, Spivak, McClelland, Maier & Neustadt

[57] ABSTRACT

A resin composition comprising a polyester and a modified polyolefin, wherein said polyester has an amide bond in polymer main chain and said modified polyolefin has a carboxylic acid group or a derivative thereof.

12 Claims, No Drawings

RESIN COMPOSITION AND MULTI-LAYER STRUCTURAL MATERIAL THEREFROM

The present invention relates to an adhesive resin composition useful for producing a polyester and/or polyolefin multi-layer film, sheet, container, etc. and a multi-layer structural material useful for packaging material.

A polyester, particularly polyethylene terephthalate (PET) is excellent in chemical resistance, heat resistance, mechanical properties, electric properties, etc., and used as fiber, film, etc. for many industrial products. Further, PET is also excellent in gas barrier properties and transparency, whereby it is used as material for containers of seasoning, soft drink, detergent, cosmetic, and the like.

However, PET is inferior in heat-sealing properties because of its high melting point and also rigid. Thus, there arose a problem when PET was used as packaging material for certain products. Under the circumstances, it was tried to develop a multi-layer film comprising PET and polyolefin to solve these drawbacks.

However, there was also a problem to be solved in this development. Namely, a problem on bonding of PET and a polyolefin remained. Because polarities of PET and a polyolefin are considerably different from each other, they are hardly bonded in nature, and there has been no good adhesive resin.

As a method for obtaining an adhesive to meet this object, a means of providing adhesive strength to both PET and a polyolefin by mixing a polyester having an affinity for PET and a modified polyolefin having an affinity for a polyolefin, may be mentioned. However, as mentioned above, the polarities of a polyester and a polyolefin are considerably different from each other, and it is not easy to mix them. In fact, dispersion of a composition obtained by melt kneading of both materials is poor, and a stable structure can not be maintained when subjected to heat history.

The present invention has been made to solve such conventional problems. Namely, an object of the present invention is to provide a resin composition having excellent adhesive strength to both an aromatic ring-containing polyester and polyolefin resins, and a multi-layer structural material using it.

Another object of the present invention is to provide a modifier for compatibility between an aromatic ring-containing polyester and polyolefin resins.

The present inventors have found that by mixing a polyester partially containing an amide bond in its polymer main chain with a modified polyolefin, both compounds can be remarkably finely dispersed. The present inventors have further found that the composition thus obtained exhibits excellent adhesive strength to both an aromatic polyester resin represented by PET and a polyolefin resin.

Thus, the present invention provides a resin composition comprising a polyester and a modified polyolefin, wherein the polyester has an amide bond in polymer main chain and the modified polyolefin has a carboxylic acid group or a derivative thereof, and a multi-layer structure material comprising a layer of the resin composition, wherein a layer of an aromatic ring-containing polyester resin or a polyolefin resin is formed on a side of the layer of the resin composition.

The polyester to be used in the present invention is obtained by subjecting a diol of the following formula I and a dicarboxylic acid of the following formula II or an ester-forming derivative thereof to condensation reaction and has an amide bond in its polymer main chain.

(Each of $R_1$ and $R_2$ is a bivalent organic group having a carbon number of from 2 to 40.)

The diol of the formula I includes ethylene glycol, diethylene glycol, a polyethylene glycol, 1,2-propylene glycol, 1,3-propanediol, 1,2-butanediol, 1,3-butanediol, 1,4-butanediol, 2-ethyl-1,3-hexanediol, 2,2,4-trimethyl-1,5-pentadiol, neopentyl glycol, 1,6-hexanediol, 1,12-dodecanediol, cyclohexane-1,4-diol, cyclohexane-1,3-diol, 1,4-cyclohexanedimethanol, p-xylenediol, 4,4'-thiodiphenol, 4,4'-methylenediphenol, 4,4'-dihydroxybiphenyl, 4,4'-isopropylidenediphenol, 4,4'-isopropylidenebis(2,6-dichlorophenol), 2,5-naphthalenediol, 2,5-norbornanediol, hydroquinone, resorcin, methylhydroquinone, chlorohydroquinone, acetylhydroquinone, acetoxyhydroquinone, nitrohydroquinone, dimethylaminohydroquinone, 1,4-dihydroxynaphthol, 1,5-dihydroxynaphthol, 1,6-dihydroxynaphthol, 2,6-dihydroxynaphthol, 2,7-dihydroxhnaphthol, 2,2,-bis(4-hydroxyphenyl)-propane, 2,2-bis(4-hydroxy-3,5-dichlorophenyl)-propane, 2,2-bis(4-hydroxy-3-methylphenyl)-propane, 2,2-bis(4-hydroxy-3-chlorophenyl)-propane, bis(4-hydroxy-3,5-dimethylphenyl)-methane, bis(4-hydroxy-3,5-dichlorophenyl)-methane, bis(4-hydroxy-3,5-dibromophenyl)-methane, 1,1-bis(4-hydroxyphenyl)-cyclohexane, 4,4'-dihydroxydiphenyl-bis(4-hydroxyphenyl)-ketone, bis(4-hydroxy-3,5-dimethylphenyl)-ketone, bis(4-hydroxy-3,5-dichlorophenyl)-ketone, bis(4-hydroxyphenyl)-sulfide, bis(4-hydroxy-3-chlorophenyl)sulfide, bis(4-hydroxyphenyl)-sulfone, bis(4-hydroxy-3,5-dichlorophenyl)-ether, a dimer acid-hydrogenated diol and a polyolefin polyol. These diols may be used alone or in combination as a mixture of at least two diols.

Further, the dicarboxylic acid of the formula II includes malonic acid, succinic acid, glutaric acid, adipic acid, pimelic acid, sebacic acid, azelaic acid, suberic acid, dodecanedicarboxylic acid, 3-methylazelaic acid, cyclohexane-1,3-dicarboxylic acid, cyclopentane-1,3-dicarboxylic acid, terephthalic acid, methoxyterephthalic acid, ethoxyterephthalic acid, fluoroterephthalic acid, chloroterephthalic acid, methyl terephthalic acid, isophthalic acid, phthalic acid, methoxyisophthalic acid, diphenylmethane-4,4'-dicarboxylic acid, diphenylmethane-3,3'-dicarboxylic acid, diphenylether-4,4'-dicarboxylic acid, diphenyl-4,4'-dicarboxylic acid, naphthalene-2,6-dicarboxylic acid, naphthalene-1,5-dicarboxylic acid, naphthalene-1,4-dicarboxylic acid, 2,5-norbornanedicarboxylic acid, 4,4'-oxydibenzoic acid, 4,4'-methylenedibenzoic acid, diglycolic acid, thiodipropionic acid, diphenic acid, p-oxy(p-carboxyphenyl)benzoic acid, tetramethylene-bis(p-oxybenzoic acid), a dimer acid, a hydrogenated dimer acid and esters thereof.

These carboxylic acids or esters thereof may be used alone or in combination as mixture of at least two compounds. Particularly preferred is a combination of terephthalic acid and at least one member selected from the group consisting of adipic acid, sebacic acid, a dimer acid and a hydrogenated dimer acid.

The dimer acid used in the present invention means a so-called dimerized fatty acid. A polymerized fatty acid obtained by polymerizing an unsaturated fatty acid is generally used. As unsaturated fatty acid, for example, a monobasic fatty acid having at least one double bond or triple bond and having from 8 to 24 carbon atoms is used, which may be one obtained from natural fats and oils or one synthesized. As representatives of dimerized fatty acid, dimers of linolenic acid and linoleic acid may be mentioned.

A commercially available polymerized fatty acid usually includes a dimerized fatty acid as main component, and the starting material fatty acid and a trimerized fatty acid as other components. According to the present invention, the polymerized fatty acid having a dimerized fatty acid content of at least 70% by weight, preferably at least 95% by weight, more preferably at least 98% by weight, is used. As means for increasing the content of a dimerized fatty acid, distillation may be utilized. Further, a hydrogenated dimer acid means one obtained by hydrogenating the polymerized fatty acid to reduce the degree of unsaturation. A hydrogenated dimer acid having a hydrogenation degree of 100% is usually used.

As derivatives of the dimerized fatty acid, those having an amino group in the terminal may be mentioned, which can be obtained by amination of the carboxylic acid moiety of the dimerized fatty acids.

The polyester to be used in the present invention can be obtained by condensation of a diol of formula I and a dicarboxylic acid of formula II or an ester thereof in accordance with conventional method. As method for introducing an amide bond into the polyester, a method to copolymerize a diamine such as propanediamine, hexamethylenediamine or octamethylenediamine, a lactam such as $\epsilon$-caprolactam, piperidone, valerolactam, capryllactam or lauryllactam, a polyamide or an amide oligomer during the polymerization of polyester, or a method to melt-mix a polyester with the above-mentioned diamine, lactam, polyamide or amide oligomer after polymerization of the polyester, may be applied. As the amine, hexamethylenediamine is particularly preferred.

The amount of the amide bond contained in the polyester is preferable from $5 \times 10^{-4}$ to $1 \times 10^{-1}$ mol, more preferably from $5 \times 10^{-3}$ to $1 \times 10^{-1}$ mol per 100 gram polyester. The amount of the amide bond to be introduced can be controlled by changing the amount of the starting material charged in the above method.

If the amount of the amide bond is too small, adhesive properties and compatibility are poor. On the other hand, if the amount is too large, characteristics of the polyester such as chemical resistance, heat resistance and mechanical properties are degraded.

The modified polyolefin of the present invention includes a polyolefin such as polyethylene or polypropylene, an olefin copolymer obtained by copolymerizing at least two $\alpha$-olefins such as ethylene, propylene and butene and an olefin copolymer obtained by copolymerizing the $\alpha$-olefin and a diene such as butadiene or other copolymerizable monomer, which contain in their molecule a carboxyl group and/or carboxylic acid derivative group such as acid anhydride group.

This modified polyolefin can be obtained in accordance with a conventional method. For example, a method wherein an $\alpha,\beta$-unsaturated carboxylic acid or acid derivative thereof is grafted to a polyolefin such as polyethylene in an organic solvent or in the presence of radical-generating agent under molten state or a method wherein an $\alpha,\beta$-unsaturated carboxylic acid or acid derivative thereof and an olefin such as ethylene are subjected to radical copolymerization may be mentioned. The weight-average molecular weight of the polyolefin is preferably in a range from 5000 to 500,000, and the average number of the functional group of carboxylic acid group or acid derivative thereof is preferably from 0.5 to 50 per one molecule of the modified polyolefin.

As examples of $\alpha,\beta$-unsaturated carboxylic acid or acid derivative thereof of the present invention, acrylic acid, methacrylic acid, crotonic acid, maleic acid, itaconic acid, citraconic acid, mesaconic acid, esters thereof, and acid anhydrides thereof may be mentioned. As the acid anhydrides, maleic anhydride, citraconic anhydride, itaconic anhydride, dichloromaleic anhydride and dimethylmaleic anhydride may be mentioned.

According to the present invention, the amide bond-containing polyester resin and the modified polyolefin resin are mixed in a ratio of from 99 to 1% by weight of the polyester and from 1 to 99% by weight of the modified polyolefin, preferably from 80 to 20% by weight of the polyester and from 20 to 80% by weight of the modified polyolefin.

For mixing the resins, the resins are mixed under heating at least a temperature at which both resins are melted, usually from 150° C. to 300° C. in Brabender PlastiCorder, monoaxial or multiaxial extruder. The mixing is conducted under an inert gas stream or under reduced pressure, if necessary.

If a case requires, the mixing can be conducted in an organic solvent such as toluene or xylene.

The resin composition of the present invention is useful as a bonding layer for multi-layer structural material having a polyester or polyolefin layer. The multi-layer structural material of the present invention comprises a layer of the resin composition having an amide bond-containing polyester resin and a modified polyolefin resin mixed, and a layer of an aromatic ring-containing polyester resin or a polyolefin resin formed on at least one side of the layer of the resin composition.

According to the present invention, the aromatic ring-containing polyester formed on a layer of the resin composition is a polyester wherein a dicarboxylic acid or ester thereof and/or a diol which is a polyester forming component has an aromatic ring. Particularly a polyester derived from an aromatic dicarboxylic acid or ester thereof, for example, a polyethylene terephthalate, may be mentioned.

Further, the polyolefin formed on a layer of the resin composition according to the present invention includes a low-density polyethylene, a linear low-density polyethylene, high-density polyethylene, polypropylene and ethylene-vinyl acetate copolymer.

Among the multi-layer structural materials according to the present invention, preferred is the multi-layer structural material having a layer structure such as A/B, A/C, B/A/C and A/B/A/C wherein the layer of the resin composition of the present invention is A, the layer of the aromatic ring-containing polyester layer is B and the layer of the polyolefin resin is C. Thickness of each layer constituting the multi-layer structural material is not particularly restricted, and in the case of multi-layer film, the thickness of from 1 to 500 μm is generally preferred.

The multi-layer structural material can be used as multi-layer structural material further laminated with an aluminum plate (foil), paper, a metal plate, another plastic film, a sheet, etc.

There is no particular restriction as to method for producing the multi-layer structural material, and as simple manner, it can be produced by laminating films or sheets corresponding to each layer, followed by heating and pressing. As industrial manner, co-extruding method wherein melted resins are bonded in the same dies by using a plurality of extruders or co-extruding/co-stretching method wherein the co-extruding method is followed by stretching, may be used.

Furthermore, as a case requires, the resin composition of the present invention can be dispersed or dissolved in an organic solvent and coated on a film of a polyester and/or polyolefin followed by drying to laminate the layers.

Now, the present invention will be described in further detail with reference to Examples. However, it should be understood that the present invention is by no means restricted by such specific Examples.

In the following Examples, a viscosity was measured in tetrachloroethane/phenol=b 50/50 (weight ratio) at 30° C., and calculated in accordance with the following equation:

$$\eta_{inh} = \frac{ln \eta_{sp}}{C} \quad IV$$

wherein $\eta_{sp}$ is a specific viscosity and C is a concentration.

POLYESTER RESIN PREPARATION EXAMPLES 1-9

Preparation Example 1

Into a glass polymerization tube equipped with a stirrer, a nitrogen inlet and a vacuum outlet, 80.0 g (0.315 mol) of bishydroxyethyl terephthalate, 16.4 g (0.158 mol) of neopentyl glycol, 18.4 g (0.126 mol) of adipic acid and 1.95 g (0.0168 mol) of hexamethylenediamine were introduced, and vacuum-nitrogen replacement was repeated 3 times. The polymerization tube was heated to 230° C. and the reaction was conducted for 3.5 hours. Then, 0.05 g of tetrabutoxytitanium was added and the pressure was gradually reduced and maintained at 0.5 mmHg. After the polymerization was conducted for 2 hours, nitrogen was introduced into the polymerization tube to return the pressure to normal pressure, and the polymerization was stopped.

The resulting product could be drawn from the bottom of the polymerization tube and the polymer thus obtained was light brown and transparent. $\eta_{inh}$ of the polymer thus obtained was 0.49 dl.g$^{-1}$.

Preparation Example 2

Into the same polymerization tube as in Preparation Example 1, 80.0 g (0.315 mol) of bishydroxyethyl terephthalate, 16.4 g (0.158 mol) of neopentyl glycol, 18.4 g (0.126 mol) of adipic acid, 14.2 g of a halogenated dimer acid (EMPOL (registered trademark) 1010 manufactured by Emery Co.) and 1.95 g (0.0168 mol) of hexamethylenediamine were introduced. As in Preparation Example 1, the reaction was conducted at 230° C. under normal pressure for 3.5 hours and 0.05 g of tetrabutoxytitanium was added and the pressure was gradually reduced and maintained at 0.5 mmHg, followed by polymerization for 2 hours.

The resulting product was able to be drawn from the bottom of the polymerization tube and $\eta_{inh}$ of the polymer thus obtained was 0.51 dl.g$^{-1}$.

Preparation Example

Into the same polymerization tube as in Preparation Example 1, 80.0 g (0.315 mol) of bishydroxyethyl terephthalate, 16.4 g (0.158 mol) of neopentyl glycol, 18.4 g (0.126 mol) of adipic acid, 19.0 g of a halogenated dimer acid (EMPOL 1010 manufactured by Emery Co.) and 0.98 g (0.0084 mol) of hexamethylenediamine were introduced. As in Preparation Example 1, the reaction was conducted at 230° C. under normal pressure for 3.5 hours and then the pressure was gradually reduced and maintained at 0.5 mmHg followed by polymerization for 2 hours.

The resulting product was able to be drawn from the bottom of the polymerization tube and $\eta_{inh}$ of the polymer thus obtained was 0.45 dl.g$^{-1}$.

Preparation Example 4

The same operation as in Preparation Example 3 was conducted except that 1.95 g of hexamethylenediamine was introduced, whereby a polymer was obtained.
$\eta_{inh}$ Of the polymer was 0.50 dl.g$^{-1}$.

Preparation Example 5

The same operation as in Preparation Example 3 was conducted except that 3.90 g of hexamethylenediamine was introduced, whereby a polymer was obtained.
$\eta_{inh}$ of the polymer was 0.52 dl.g$^{-1}$.

Preparation Example 6

Into the same polymerization tube as used in Preparation Example 1, 73.3 g (0.377 mol) of dimethyl terephthalate, 18.3 g (0.0942 mol) of dimethyl isophthalate, 70.0 g (1.13 mol) of ethylene glycol and 0.03 g of tetrabutoxytitanium were introduced and vacuum-nitrogen replacement was repeated 3 times.

The polymerization tube was heated to 150° C. and the reaction was conducted at 210° C. for 3 hours while the temperature was gradually raised and methanol formed was distilled off. Then, 40.0 g of hydrogenated dimer acid (EMPOL 1010 manufactured by Emery Co.) and 2.1 g of hexamethylenediamine were added and reacted at 210° C. for 1 hour. Then, 0.02 g of tetrabutoxytitanium was added and the pressure was gradually reduced and maintained at 0.5 mmHg. At the same time, the temperature was gradually raised to 230° C. and polymerization was conducted for 2 hours.

The resulting product was able to be drawn from the bottom of the reaction tube and $\eta_{inh}$ of the product was 0.61 dl.g$^{-1}$.

Preparation Example 7

Into the same polymerization tube as used in Preparation Example 1, 80.0 g (0.315 mol) of bishydroxyethyl terephthalate, 16.4 g (0.158 mol) of neopentyl glycol, 18.4 g (0.126 mol) of adipic acid and 11.4 g of an amide oligomer (Polymide (registered trademark) S150 manufactured by Sanyo Kasei K.K.) were introduced and vacuum-nitrogen replacement was repeated 3 times. The reaction tube was heated to 230° C. and the reaction was conducted for 3.5 hours followed by addition of 0.05 g of tetrabutoxytitanium. Then, the pressure was gradually reduced and maintained at 0.5 mmHg. After conducting polymerization for 2 hours, nitrogen was introduced to the system to return the pressure, and the resulting product was drawn from the bottom of the polymerization tube.

The resulting product was light-brown and transparent having $\eta_{inh}$ of 0.59 dl.g$^{-1}$.

Preparation Example 8

The same operation as in Preparation Example 1 was conducted except that no hexamethylenediamine was added. $\eta_{inh}$ of the polymer thus obtained was 0.53 dl.g$^{-1}$.

Preparation Example 9

The same operation as in Preparation Example 6 was conducted except that no hexamethylenediamine was added. $\eta_{inh}$ of the resulting polymer was 0.59 dl.g$^{-1}$.

Example 1

30 g of the polyester obtained in Preparation Example 1 and 20 g of an acid anhydride modified polyolefin (Novatec® AP220L manufactured by Mitsubishi Kasei Corporation) were kneaded at 210° C. 30 rpm for 5 minutes by a batch type melt kneading apparatus.

The kneaded composition thus obtained was placed between the films of a low-density polyethylene film (LDPE) and polyethylene terephthalate (PET), and thermal press molding was conducted at 250° C. under 10 kg-cm$^{-1}$ to obtain a multi-layer film comprising LDPE/the kneaded composition/PET having a thickness of 100 μm/20 μm/100 μm).

The multi-layer film thus obtained was cut into a strip having a width of 10 mm, and T-peeling strength was measured. The result thus obtained is shown in Table 1.

Further, the concentration of the amide bond in the polyester was measured from IR spectrum of the polyester. The result is also shown in Table 1.

Examples 2-7

The same operation was conducted as in Example 1 except that each polyester prepared in Preparation Examples 2-7 was used to obtain each multi-layer film. T-peeling strength of each film was measured. The results thus obtained are shown in Table 1.

Comparative Examples 1-2

The same operation as in Example 1 was conducted except that each polyester prepared in Preparation Example 8 and 9 was used to obtain each multi-layer film. T-peeling strength of each film was measured. The results thus obtained are shown in Table 1.

TABLE 1

| | Polyester | Modified polyolefin | T-peeling strength (kg · cm$^{-1}$) | Concentration of amide bond in polyester (mol/100 g) |
|---|---|---|---|---|
| Example 1 | Preparation Example 1 (30 g) | AP220L (20 g) | 2.4 | 0.036 |
| Example 2 | Preparation Example 2 (30 g) | AP220L (20 g) | 2.7 | 0.031 |
| Example 3 | Preparation Example 3 (30 g) | AP220L (20 g) | 3.0 | 0.015 |
| Example 4 | Preparation Example 4 (30 g) | AP220L (20 g) | 3.2 | 0.029 |
| Example 5 | Preparation Example 5 (30 g) | AP220L (20 g) | 3.2 | 0.059 |
| Example 6 | Preparation Example 6 (30 g) | AP220L (20 g) | 3.2 | 0.027 |
| Example 7 | Preparation Example 7 (30 g) | AP220L (20 g) | 2.8 | 0.022 |
| Comparative Example 1 | Preparation Example 8 (30 g) | AP220L (20 g) | 0.7 | — |
| Comparative Example 2 | Preparation Example 9 (30 g) | AP220L (20 g) | 1.2 | — |

Although the resin composition of the present invention comprises a polyester and a polyolefin whose polarities are considerably different from each other, the dispersibility of the resin components in the resin composition are excellent. Further, the resin composition of the present invention has excellent adhesive properties to both the polyester and polyolefin. Thus, the resin composition of the present invention is useful as adhesive layer for multi-layer structural material. Furthermore, the multi-layer structural material with an aromatic ring-containing polyester and a polyolefin resin are useful for packaging material, particularly for packaging material of food.

Still furthermore, the resin composition of the present invention is useful for resin modifier such as polyester impact modifier or for compatibility improving agent to a polymer alloy of a polyolefin and a polyester or a resin thereof.

We claim:

1. A multi-layer structural material, comprising:
   i) a layer consisting of a resin composition consisting of a polyester having amide bonds in the main polymer chain and a polyolefin modified with carboxylic acid groups or derivatives thereof; and
   ii) a layer of an aromatic ring-containing polyester resin or of a polyolefin resin adjacent to the layer of the resin composition.

2. The multi-layer structural material according to claim 1, wherein the layer formed on the layer of the resin composition is an aromatic ring-containing polyester resin.

3. The multi-layer structural material according to claim 1, wherein the layer formed on the layer of the resin composition is a polyolefin resin.

4. The multi-layer structural material according to claim 2, wherein the aromatic ring-containing polyester is polyethylene terephthalate.

5. The multi-layer structural material according to claim 3, wherein the polyolefin is a polyethylene.

6. The multi-layer packaging material comprising the multi-layer structural material of claim 1.

7. The multi-layer structural material according to claim 1 wherein the modified polyolefin is one obtained by subjecting a polyolefin and α,β-unsaturated carboxylic acid or a derivative thereof to graft reaction.

8. The multi-layer structural material according to claim 1 wherein the modified polyolefin is a copolymer of an olefin and a vinyl monomer containing a carboxylic acid group or a derivative thereof.

9. The multi-layer structural material according to claim 1 wherein the polyester with an amide bond is a condensate of a diol of the following formula I and a dicarboxylic acid of the following formula II or an ester-forming derivative thereof, and having an amide bond of the following formula III in the polymer main chain in a range of from $5 \times 10^{-4}$ to $1 \times 10^{-1}$ mol per 100 gram polymer:

$$\text{HO}-\text{R}_1-\text{OH} \qquad \text{I}$$

$$\underset{\text{HOC}-\text{R}_2\text{COH}}{\overset{\text{O} \quad \text{O}}{\underset{\|}{\|} \quad \underset{\|}{\|}}} \qquad \text{II}$$

$$\underset{-\text{C}-\text{N}-}{\overset{\text{O} \quad \text{H}}{\underset{\|}{\|} \quad \underset{|}{|}}} \qquad \text{III}$$

wherein each of $R_1$ and $R_2$ is a bivalent organic group having a carbon number of from 2 to 40.

10. The multi-layer structural material according to claim 9 wherein the dicarboxylic acid of the formula II is a mixture of terephthalic acid and at least one member selected from the group consisting of adipic acid, sebacic acid, a dimer acid and a hydrogenated dimer acid.

11. The multi-layer structural material according to claim 1 wherein the weight ratio of the polyester with an amide bond to the modified polyolefin is in a range of from 99:1 to 1:99.

12. A multi-layer structural material, comprising:
 i) a layer consisting of a resin composition consisting of a polyester having amide bonds in the main polymer chain and a polyolefin modified with carboxylic acid groups or derivatives thereof;
 ii) a layer of an aromatic ring-containing polyester resin on one side of the layer i); and
 iii) a layer of a polyolefin resin on the remaining side of the layer i).

* * * * *